United States Patent [19]

Brent et al.

[11] 4,371,378
[45] Feb. 1, 1983

[54] SWIRL BURNER FOR PARTIAL OXIDATION PROCESS

[75] Inventors: Albert Brent, Huntington; Charles P. Marion, Mamaroneck, both of N.Y.; George N. Richter, San Marino, Calif.; William B. Crouch, Chappaqua; Edward T. Child, Tarrytown, both of N.Y.; Blake Reynolds, Riverside, Conn.

[73] Assignee: Texaco Inc., White Plains, N.Y.

[21] Appl. No.: 212,054

[22] Filed: Dec. 3, 1980

Related U.S. Application Data

[63] Continuation-in-part of Ser. No. 167,876, Jul. 14, 1980, and a continuation-in-part of Ser. No. 107,215, Dec. 26, 1979, Pat. No. 4,338,099.

[51] Int. Cl.³ .............................................. C10J 3/50
[52] U.S. Cl. ................................. 48/86 R; 239/132.3; 239/399; 239/404; 239/405; 239/406; 239/487
[58] Field of Search ............... 48/63, 97, 64, 86 R, 48/73; 239/400, 403, 404, 405, 406, 399, 487, 132.3

[56] References Cited

U.S. PATENT DOCUMENTS 2,928,460 3/1960 Eastman et al. .................... 202/373
3,945,942 3/1976 Marion et al. .................... 48/197 R

FOREIGN PATENT DOCUMENTS

1229802 4/1971 United Kingdom ............... 239/403

Primary Examiner—Peter F. Kratz
Attorney, Agent, or Firm—Carl G. Ries; Robert A. Kulason; Albert Brent

[57] ABSTRACT

A swirl burner and partial oxidation process for producing synthesis gas, fuel gas or reducing gas from slurries of solid carbonaceous fuel and/or liquid or gaseous hydrocarbon fuel. The swirl burner may have pre-mix and/or high turndown features. By means of the burner a first reactant stream is split into a plurality of swirling streams by being passed down through a central bundle of helical tubes. Simultaneously a second reactant stream is split into a plurality of swirling streams by being passed down through a plurality of related passages formed in the cylindrical space that surrounds said central bundle of helical tubes and/or the interstices between the helical tubes. When the two swirling reactant feed streams impinge, either upstream from the face of the burner in a pre-mix zone or downstream from the face of the burner, in the gas generator, they are intimately mixed together. The combustion efficiency of the burner is thereby improved. In another embodiment, the burner includes a coaxial annular bundle of helical tubes surrounding said first conduit and a plurality of related helical passages formed in the annular space occupied by said annular bundle of helical tubes. Flow through the burner may be turned up or down.

32 Claims, 5 Drawing Figures

SWIRL BURNER FOR PARTIAL OXIDATION PROCESS

This application is a continuation-in-part of parent application Ser. No. 167,876, filed July 14, 1980, and application Ser. No. 107,215 filed Dec. 26, 1979, and now U.S. Pat. No. 4,338,099.

BACKGROUND OF THE INVENTION

1. Field of the Invention

This invention relates to the manufacture of gaseous mixtures comprising $H_2$ and CO, e.g., synthesis gas, fuel gas, and reducing gas by the partial oxidation of pumpable slurries of solid carbonaceous fuels in a liquid carrier and/or liquid or gaseous hydrocarbon fuel. In one of its more specific aspects, the present invention relates to an improved burner for such gas manufacture.

2. Description of the Prior Art

Annulus-type burners have been employed for introducing liquid hydrocarbonaceous fuels into a partial oxidation gas generator. For example, coassigned U.S. Pat. No. 3,528,930 shows a single annulus burner, and coassigned U.S. Pat. Nos. 3,758,037 and 3,847,564 show double annulus burners. To obtain proper mixing, atomization, and stability of operation a burner is sized for a specific throughput. Should the required output of product gas change substantially, with prior-art burners, shut-down of the system is required in order to replace the prior-art burner with one of proper size. This problem is avoided and costly shut-downs are avoided by the subject burner which will operate at varying levels of output while retaining efficiency and stability. The more complex process for preheating a gas generator by means of a preheat burner, removing the preheat burner from the gasifier, and inserting a separate production burner is described in coassigned U.S. Pat. No. 4,113,445.

The nozzle tip of the central conduit of such prior art burners is substantially flush with or close to the face of the burner, and substantially no premixing of the reactants takes place upstream from the face of the burner. Accordingly in such burners, substantially all of the atomizing and mixing of the fuel stream with the oxygen stream takes place downstream from the face of the burner.

SUMMARY OF THE INVENTION

In the partial oxidation of liquid phase slurries of solid carbonaceous fuels to produce synthesis gas, fuel gas, or reducing gas, problems of combustion instability and poor efficiency which may be encountered with prior-art flush face burners have been eliminated by employing the subject invention.

The subject novel swirl burner may have pre-mix and/or high turndown features. By means of the subject burner, separate swirling feed streams may be intimately mixed together to produce a multi-phase mixture for reaction in a partial oxidation gas generator comprising: a central bundle of open-ended helical tubes whose central longitudinal axis is coaxial with the central longitudinal axis of the burner and comprising a plurality of helical tubes having inlet portions in communication with upstream inlet means by which a first reactant feed stream may be introduced and then split into a plurality of separate streams which pass down through said central bundle of helical tubes and are then discharged through the downstream ends of said tubes; a first coaxial cylindrical conduit concentric with and surrounding said central bundle of helical tubes, said first conduit being closed near the upstream end so that the inlet portions of said plurality of helical tubes may pass through and make a gastight seal therewith and having an unobstructed circular downstream outlet at the tip of the burner; upstream inlet means in communication with said first conduit through which a second reactant feed stream may be separately introduced and split into a plurality of swirling streams which may pass down through a plurality of related helical-shaped passages formed in the cylindrical space that surrounds said central bundle of helical tubes and/or through the interstices, if any, between said helical tubes; and means for supporting said central bundle of helical tubes with respect to said first conduit and each other; and wherein the downstream tips of said central bundle of helical tubes are retracted upstream from the downstream face of the burner a distance of 0–12, such as about 2 or more, say about 3–10 times the minimum diameter of said first conduit downstream outlet; and said first and second swirling reactant feed streams impinge together and are intimately mixed.

When the two swirling reactant streams impinge, either upstream in a pre-mix zone or downstream from the face of the burner, intimate mixing and atomization may take place. The combustion efficiency of the burner is thereby improved.

In another embodiment, the burner includes a coaxial annular bundle of helical tubes surrounding said first conduit and a plurality of related annular passages formed in the annular space occupied by said annular bundle of helical tubes. By this means, flow through the burner may be easily turned up or down. For example, the burner may be operated with the first and second feed streams passing through the central bundle of helical tubes and the related surrounding passages and/or with third and fourth feed streams passing through the annular bundle of helical tubes and the related surrounding passages.

When a pre-mix zone is employed, the reactants are thoroughly mixed together and simultaneously about 0 to 100 vol. %, say about 2 to 80 vol. % of the liquid carrier may be vaporized. In one embodiment, the mixture leaving one pre-mix chamber expands into the next pre-mix chamber in the line. The change in velocity of the mixture swirling through the successive pre-mix chambers assures a thorough mixing of the feed streams prior to discharge from the burner. The multiphase mixture is passed through the exit nozzle at the downstream tip of the burner at a discharge velocity which is greater than the flame propagating velocity.

BRIEF DESCRIPTION OF THE DRAWING

In order to illustrate the invention in greater detail, reference is made to several embodiments involving burner constructions as shown in the figures of the drawing, wherein.

DESCRIPTION OF THE INVENTION

The present invention involves a novel burner and the process for the manufacture of gas mixtures comprising $H_2$, $CO$, $CO_2$ and at least one material selected from the group consisting of $H_2O$, $N_2$, A, $CH_4$, $H_2S$ and COS, such as synthesis gas, fuel gas, and reducing gas, by the partial oxidation of a reactant stream selected from the group consisting of a pumpable slurry of solid carbonaceous fuel in a liquid carrier, liquid or gaseous hydrocarbon fuel, and mixtures thereof with or without admixture with a temperature moderator, with a reactant stream of free-oxygen containing gas with or without admixture with a temperature moderator. The product gas mixture is produced in the reaction zone of a noncatalytic refractory-lined, free-flow partial oxidation gas generator, such as described in coassigned U.S. Pat. No. 2,809,104 issued to Dale M. Strasser et al at a temperature in the range of about 1700° to 3500° F. and a pressure in the range of about 1 to 300 atmosphere, such as about 5 to 250 atmospheres, say about 10 to 100 atmospheres.

During operation of a partial oxidation gas generator, it may be necessary to rapidly turndown the production of the effluent gas to about ⅛ to ¾ of the plant-design output, without replacing the burner. Changing the burner requires a costly shut-down period with resultant delay. Thus, in combined cycle operation for power generation a durable burner is required which offers minimum pressure drop and with which throughput levels may be rapidly changed—up and down—without sacrificing stable operation and efficiency. Further, the burner should be capable of operation with a variety of liquid, solid, and gaseous fuels, and mixtures thereof. These requirements have been fulfilled in one embodiment of the subject burner.

Combustion instability and poor efficiency can be encountered with prior art burners are used for the gasification of liquid phase slurries of solid carbonaceous fuels. Further, feed streams may be poorly mixed and solid fuel particles may pass through the gasifier without contacting significant amounts of oxygen. Unreacted oxygen in the reaction zone may then react with the product gas.

These problems and others are avoided by the subject novel swirl burner which may be constructed in the following manner. A first cylindrical conduit is closed at the upstream end and has an unobstructed circular exit orifice at the downstream tip of the burner. A central bundle of open-ended helical tubes, extends longitudinally down said first conduit. The upstream inlet portion of each individual helical coil in said central bundle of helical tubes preferably passes perpendicularly through a tube-sheet located below the closed end of said first conduit and makes a gastight seal therewith. The upstream open ends of the central bundle of helical tubes are in communication with a chamber, such as a cylindrical manifold, through which a first feed stream is introduced. By this means said first reactant feed stream may be split into a plurality of separate streams which pass down through the separate helical tubes in said central bundle and then discharge as a plurality of swirling streams.

The separate helical coils in the central bundle of helical tubes are supported and optionally spaced within the first conduit and with respect to each other by means of conventional supports and spacers. By this means a plurality of related free-flow helical-shaped passages may be formed in the cylindrical space occupied by the central bundle of helical tubes. A second feed stream is introduced near the upstream end of said first conduit, splits into separate streams upon passing down through said helical passages or into the interstices between the helical tubes, and then discharges as a plurality of swirling or turbulent streams. The plurality of first and second feed streams impinge either downstream from the face of the burner or in a pre-mix zone upstream from the face of the burner where intimate mixing and atomization takes place.

The central bundle of helical tubes is coaxial with the central longitudinal axis of the burner and preferably comprises at least one and with larger burners a plurality of equally spaced concentric rings of multiple helices with a common axis occupying a cylindrical space. Preferably, the inlets and outlets of the plurality of helical coils in the central bundle are located at the intersections of at least one and preferably a plurality of evenly spaced radial rows and said concentric ring or rings. The sides of the individual helical coils in adjacent concentric rings may or may not touch. When they touch, at least a portion of the second reactant feed stream may flow through said plurality of helical passages formed within said first conduit by the screw-shaped outside surfaces of said central bundle of helical tubes. By separating the helical coils in adjacent rings, more of the second feed stream may be made to flow into the interstices between the helical coils in said central bundle. Thorough mixing together of the first and second feed streams is provided by either one or both of these schemes. Further, atomization may take place.

In another embodiment, the previously described swirl burner has a high-turn-down capability. In this embodiment a second coaxial cylindrical conduit is radially spaced from and surrounds said first coaxial cylindrical conduit along its length. An annular space is thereby provided between said first and second coaxial conduits. The annular space is closed at the upstream end and has an unobstructed downstream annular exit orifice at the tip of the burner.

An annular bundle of open-ended helical tubes comprising a plurality of concentric helical coils with a common axis occupies said annular space. The upstream inlet portion of each individual helical coil in said bundle of annular helical tubes preferably passes perpendicularly through an annular tube-sheet located below the closed end of said annular space and makes a gastight seal therewith. The upstream open ends of the annular bundle of helical tubes are in communication with a chamber, such as an annular manifold through which a third feed stream is introduced. By this means said third feed stream may be split into a plurality of separate streams which pass down through the separate helical tubes in said annular bundle and discharge as a plurality of swirling streams.

The separate helical coils in the annular bundle of helical tubes are supported and optionally spaced within said annular space and with respect to each other by means of conventional supports and spacers. By this means a plurality of related helical-shaped passages may be formed in the annular space which is occupied by the annular bundle of helical tubes. A fourth feed stream is introduced near the closed upstream end of said second conduit, splits into separate streams upon passing down through said helical passages or into the interstices between the helical tubes, and discharges as a plurality of swirling or turbulent streams. The plurality of third and fourth swirling feed streams impinge together and intimately mix. Further, atomization may take place.

The annular bundle of helical tubes is coaxial with the central longitudinal axis of the burner and preferably comprises at least one and preferably a plurality of equally spaced concentric rings of multiple helices with a common axis occupying said annular space. Preferably, the inlets and outlets of helical coils in the annular bundle are located at the intersections of said evenly spaced radial row or rows and said evenly spaced concentric ring or rings. In the manner discussed previously in connection with the central bundle of helical tubes the sides of individual helical coils in adjacent concentric rings may or may not touch. When they touch, said plurality of helical passages are formed within said annular space by the screw-shaped outside surfaces of said annular bundle of helical tubes. By separating the helical coils in adjacent rings, more of the fourth feed stream may be made to flow into the interstices between the helical coils in said annular bundle.

Preferably, said first and third feed streams and said second and fourth feed streams are respectively split streams from a fuel stream and a gaseous oxidant stream. In one embodiment, however, the first and fourth feed streams, and the second and third feed streams are respectively split streams from a fuel stream and a stream of gaseous oxidant.

Flow control means are provided herein for controlling the introduction of said four feed streams into the burner. Briefly, a manual or automatically controlled fluid-controller is placed in each feed line. For slurry fuel and some viscous liquids e.g. resid feed lines, a signal from the controller is transmitted to a speed control for a positive displacement pump. For gaseous and most liquid hydrocarbon fuel feed lines for oxidant feed lines, the signal from the controller is transmitted to a flow control valve. Responsive to said signal, the speed of said pump is varied, or alternately the opening in said flow control valve is changed. By this means, the flow rate for the streams of fuel and/or oxidant passing through the burner may be adjusted up or down, say up to about 50% of the Design Conditions. Alternatively, a flow control valve may be inserted in each of the four feed streams to start or stop the flow of the feed streams to the central conduit and/or the annular passage and to their respective bundles of tubes. By this means, three ranges of flow through the burner may be obtained. Further, both of these flow control schemes may be combined to vary the flow rate of each feed stream from ⅛ to ¾ of maximum.

The central bundle of helical tubes may number in the range of about 1-200 or more, such as about 2-180, say about 4-48 helical coils. The annular bundle of helical tubes may number in the range of about 1-600 or more, such as about 2-580, say about 8-96 helical coils. There may be 1 to 7 or more concentric circular rings of helical tubes in the central and/or annular bundles. All of the helical coils in either the central, annular, or both bundles of helical tubes are twisted in the same direction i.e. clockwise or counterclockwise. However in one embodiment, all of the helical coils in the central bundle of helical tubes are twisted in one direction i.e. either clockwise or counterclockwise, and all of the helical coils in the annular bundle of helical tubes are twisted in the opposite direction.

In general for large-sized burners, the greater the number of tubes in a bunch, the better the distribution of one reactant within the other reactant. The mixing of the reactant streams which takes place downstream of the ends of the tubes is facilitated by this improved distribution. Such efficient mixing of the feed streams facilitates a more uniform partial oxidation of the fuel to produce $H_2$ and CO. The combustion efficiency of the process is thus increased. In one embodiment for a small sized burner, the central and/or annular bundles of helical tubes are replaced by a single central helical coil and/or a single annular helical coil.

By means of the subject invention, the reactant streams impinge and are intimately mixed together to produce a swirling mixture which is reacted by partial oxidation in the reaction zone of the gas generator. The reactions are made to proceed in local regions were there is less opportunity for overheating the fuel with an insufficient supply of oxygen to result in the formation of soot. Thus, the amount of unconverted particulate carbon produced for a given oxygen to carbon atomic ratio in the feed may be substantially reduced. Further, "overburning" of the fuel to produce carbon dioxide is substantially reduced. It is recommended that the subject burner be made from heat and corrosion-resistant metal alloys.

The velocity of the reactant stream through the central and annular bundles of helical tubes, or alternatively through the central conduit or annular passage surrounding said tubes is in the range of about 5–100, such as 10–50 feet per second at the face of the burner when said reactant stream is a liquid hydrocarbon fuel or liquid slurry of solid carbonaceous fuel, and in the range of about 150 feet per second to sonic velocity, say 200–500 feet per second when said reactant stream is a gaseous hydrocarbon fuel or a free-oxygen containing gas with or without admixture with a temperature moderator.

The inside diameter of the tubes in the central and/or annular bundles may range from about 1/16 to 2 inches, or more. The height, spacing, and pitch of the individual coils in the central and annular helical bundles of tubes are such as to impart the desired swirl to the related feed streams and/or to permit the external reactant stream to flow evenly into the interstices between the tubes. For example, the overall height of the coils in either tube bundle may range from about 1 to 36, such as 4 to 12 inches or more. Greater heights may be required as the number of tubes and the total size of the burner increases. Preferably, the inside diameter of each tube should be the same for all tubes in the central and/or annular bundles. By this means equal flow may be obtained through all of the tubes.

In one embodiment, the ratio of the total tube cross-sectional area (basis inside diameter) for the annular bundle of helical tubes ($T_A$) to the total tube cross-sectional area (basis inside diameter) for the central bundle of helical tubes ($T_C$) may be in the range of about 2–8. Similarly in one embodiment, the ratio of the annular interstitial cross-sectional area ($I_A$) surrounding the annular bundle of helical tubes to the central interstitial cross-sectional area ($I_C$) surrounding the central bundle of helical tubes may be in the range of about 2–8.

The downstream exit ends of the plurality of central and/or annular bundles of helical tubes preferably are circularly in cross-section and terminate in the same plane perpendicular to the longitudinal central axis of the burner. In one embodiment employing pre-mix chambers, to be further described, the ends of the central and/or annular bundles of tubes are retracted upstream from the burner face to provide substantial mixing of the reactants and volatilization of the slurry medium prior to discharge.

The central conduit downstream outlet and/or the annular downstream outlet may have sections which are converging, converging-straight, or converging-diverging. For example, the central conduit downstream outlet or exit orifice or nozzle may comprise a frusto-conical rear portion having a converging angle in the range of about 15° to 90° from the central longitudinal axis of the burner. The rear portion may develop into a normal cylindrical front portion which terminates at the downstream face of the burner. The cylindrical front portion may have a height in the range of about 0 to 1.5 times its own diameter.

In one embodiment the first conduit downstream outlet comprises a converging frusto-conical rear portion that develops into a diverging frusto-conical front portion that terminates at the downstream tip of the burner. The converging and diverging angles are in the range of about 15° to 90° with the central longitudinal axis of the burner.

Similarly, said annular exit orifice or annular-shaped nozzle may comprise a generated converging frusto-conical shaped annular rear portion having a converging angle in the range of about 15° to 90° from the central axis of the frusto-conical section, said central axis being parallel to the central longitudinal axis of the burner. The rear portion may develop into a generated normal cylindrical annular front portion which terminates at the downstream face of the burner. The cylindrical front portion may have a height in the range of about 0 to 1.5 times its own width. Alternately, the converging rear portion may develop into a generated diverging frusto-conical shaped annular front portion having a diverging angle in the range of about 15° to 90° from the central axis of the frusto-conical section.

In one embodiment, the central conduit downstream outlet and/or the annular downstream outlet are in the shape of or is generated by an American Society of Mechanical Engineer's standard long-radius nozzle. A further description of said nozzle may be found in "Thermodynamics Fluid Flow and Heat Transmission" by Huber O. Croft, page 155, First Edition, 1938 McGraw-Hill Book Company.

The burner may be cooled on the outside by means of cooling coils that encircle the outside barrel of the burner along its length. The downstream end of the burner may be provided with a cored face plate through which a coolant is circulated. For example, an annular cooling chamber may encircle the annular exit orifice or nozzle, and/or the central conduit exit orifice or nozzle. The cooling chamber, central conduit exit orifice or nozzle, and/or the annular exit orifice or nozzle may constitute a single piece of thermal and wear resistant material such as tungsten carbide or silicon carbide. Any suitable coolant may be employed e.g. water.

In one embodiment of the subject burner, a plurality of high pressure high velocity jet streams of a gaseous material is passed into the central conduit and/or annular passage at various locations along their length. By this means atomizing of the fuel feed stream and, optionally, mixing it with the oxidant stream may be facilitated. For example, the gaseous material may be passed through a plurality of small diameter passages or holes i.e. about 0.032 to 0.50 diameter that lead into said central conduit and/or annular passage.

The gaseous material may be selected from the group consisting of steam, free-oxygen containing gas, $CO_2$, $N_2$, fuel gas, a recycle portion of the product gas, and mixtures thereof. The gaseous material may be introduced into the burner at a temperature in the range of about ambient to 1500° F. and a velocity in the range of about 100 feet per second to sonic velocity. The pressure of the gaseous material may be in the range of about 76 to 4500 psia and is greater than the pressure of the other feed streams passing through the burner.

The discharge velocity for the material leaving through the central conduit downstream outlet is in the range of about 0.5 to 1.5 times, and preferably the same as, the discharge velocity of the material leaving through the annular exit downstream outlet. The streams leaving the two exit orifices or nozzles mix together and atomization may take place immediately downstream from the face of the burner.

In another embodiment of the invention, additional mixing of the reactant streams is effected in at least one, say 2 to 5 coaxial cylindrical shaped pre-mix chambers in series in the central conduit and/or at least one, say 2 to 5 annular shaped pre-mix chambers in series in the annular passage. In such case, the downstream ends of the central bundle of helical tubes are retracted upstream from the face of the burner a distance of 0 to 12, such as about 2 or more, say about 3 to 10 times the minimum diameter of the circular exit orifice and/or the downstream ends of the annular bundle of helical tubes are retracted upstream from the face of the burner a distance of 0 to 12, such as about 2 or more, say about 3 to 10 times the minimum width of the annular exit orifice. Preferably, the downstream ends of the central and annular bundles of helical tubes are retracted upstream from the entrance to the first pre-mix chamber in the line. For example, the set back of the ends of the helical coils from the entrance to the first pre-mix chamber may be in the range of about 0.1–2.0 times the diameter or width of the first pre-mix chamber.

In one embodiment, each of the pre-mix chambers in the central conduit except the first are cylindrical shaped and comprises a coaxial cylindrical body portion followed by a coaxial at least partially converging outlet portion. The first cylindrical-shaped pre-mix chamber in the central conduit comprises a normal coaxial cylindrical body portion that discharges directly into the next in line coaxial cylindrical shaped pre-mix chamber. Each pre-mix chamber in the annular conduit except the first is annular shaped and comprises a coaxial generated normal cylindrical annular body portion followed by a coaxial generated converging frusto-conical shaped annular outlet portion. The first annular shaped pre-mix chamber comprises a coaxial generated normal cylindrical annular body portion that discharges directly into the next in line coaxial annular shaped pre-mix chamber. The converging outlet portions of said pre-mix chambers may be made from tungsten carbide or silicon carbide for increased wear resistance.

The size relationship between successive pre-mix chambers in the subject burners may be expressed in the following manner: For burners in which the pre-mix chambers in the central conduit are successively numbered 1 to 5 and/or the pre-mix chambers in the annular passage are numbered 6–10, then the ratio of the diameter of any one of said central chambers to the diameter of the next central chamber in the line i.e. $D_1:D_2$; $D_2:D_3$; $D_3:D_4$; or $D_4:D_5$ may be in the range of about 0.2–1.2. The ratio of the length of any one central pre-mix chamber in said central conduit to the length of the next central pre-mix chamber in the line i.e. $L_1:L_2$; $L_2:L_3$; $L_3:L_4$; or $L_4:L_5$ may be jin the range of about 0.1–1.0. The ratio of the annular width of any one of said annular pre-mix chambers to the width of the next annular chamber in the line i.e. $W_6:W_7$; $W_7:W_8$; $W_8:W_9$; or $W_9:W_{10}$ may be in the range of about 0.1–1.2. The ratio of the length of any one annular pre-mix chamber in said annular passage to the length of the next annular pre-mix chamber in the line, i.e. $L_6:L_7$; $L_7:L_8$; $L_8:L_9$; or $L_9:L_{10}$ may be in the range of about 0.1–1.0.

In most other respects the design of this pre-mix embodiment of the burner, including the helical coils, passages, orifices, water-cooled face-plate and cooling coils, high pressure high velocity jets of a gaseous material entering said central and/or annular pre-mix chambers, and flow control means are substantially the same as previously described. Further, the temperature, pressure and velocity ranges for the streams of materials passing through the various passages of the burner are substantially the same as those discussed previously.

In the operation of the embodiment of the burner employing pre-mix chambers flow control means may be used to control the flow of the four feed streams to the helical tubes and passages in the burner in the same manner as described previously. The feed streams entering the burner and simultaneously and concurrently passing through at different velocities impinge and mix with each other in the first pre-mix chambers. The impingement of one swirling reactant stream, such as the liquid slurry of solid carbonaceous fuel in a liquid medium optionally in admixture with a temperature moderator, with another swirling reactant stream, such as a gaseous stream of free-oxygen containing gas optionally in admixture with a temperature moderator at a higher velocity, causes the liquid slurry to break up into a fine spray. The multiphase mixture produced then successively passes through any remaining pre-mix chambers where additional mixing takes place. As the mixture passes freely through the subject unobstructed burner its velocity changes many times. For example, at various points in the burner the velocity of the mixture may range from about 20 to 600 ft. per sec. As the mixture flows from one pre-mix chamber to the next, the velocity changes are mainly the result of changes in the diameter of the flow path and the quantity and temperature of the mixture. Velocity changes along with swirling promotes a thorough mixing of the components. By operating in the region of turbulent flow, mixing may be maximized. Further, direct heat exchange between the materials takes place within the burner. From 0–100 vol. %, say about 5–25 vol. % of the liquids in the feed streams may be vaporized before the feed streams leave the burner. By means of converging exit orifices, the feed streams may be accelerated directly into the reaction zone of the partial oxidation gasifier.

Burning of the combustible materials while passing through the pre-mix zone of the burner may be prevented by discharging the multiphase mixtures at the central and annular exit orifices at the tip of the burner with a discharge velocity which is greater than the flame propagation velocity. Flame speeds are a function of such factors as composition of the mixture, temperature and pressure. They may be calculated by conventional methods or determined experimentally. The ratio of the discharge velocity for the multiphase mixture being discharged through the central exit orifice to the multiphase mixture being discharged through the annular exit orifice may be in the range of about 0.5 to 1.5, such as 1.0.

Depending on such factors as the temperature, velocity, dwell time and composition of the feed streams; the desired amount of vaporization of liquid carrier; the temperature and amount of recycle gases in the generator; and the desired life of the burner; cooling coils may or may not encircle the outside barrel of the burner along its length. For similar reasons, the burner may or may not be provided with an annular shaped cooling chamber at the downstream end.

The multiphase mixtures simultaneously departing from the central orifice and/or the annular orifice at the downstream tip of the burner mix together downstream from the face of the burner.

Advantageously, by means of the subject burner, the exothermic partial oxidation reactions take place a sufficient distance downstream from the burner face so as to protect the burner from thermal damage.

Liquid hydrocarbon fuels and/or pumpable slurries of solid carbonaceous fuels having a dry solids content in the range of about 30 to 75 wt. %, say about 40 to 70 wt. % may be passed through the inlet passages of the subject burner. For example, the fuel streams may be passed through the central and/or annular bunch of tubes. The inlet temperature of the liquid hydrocarbon fuel or the slurry is in the range of about ambient to 500° F., but preferably below the vaporization temperature of the liquid hydrocarbon fuel or the liquid carrier for the slurry at the given inlet pressure in the range of about 1 to 300 atmospheres, such as 5 to 250 atmospheres, say about 10 to 100 atmospheres.

The term solid carbonaceous fuels, as used herein to describe suitable solid carbonaceous feedstocks, is intended to include various materials and mixtures thereof from the group consisting of coal, coke from coal, char from coal, coal liquefaction residues, petroleum coke, particulate carbon soot, and solids derived from oil shale, tar sands, and pitch. All types of coal may be used including anthracite, bituminous, sub-bituminous, and lignite. The particulate carbon may be that which is obtained as a by-product of the subject partial oxidation process, or that which is obtained by burning fossil fuels. The term solid carbonaceous fuel also includes by definition bits of garbage, dewatered sanitary sewage, and semi-solid organic materials such as asphalt, rubber and rubber-like materials including rubber automobile tires which may be ground or pulverized to the aforesaid particle size. Any suitable grinding system may be used to convert the solid carbonaceous fuels or mixtures thereof to the proper size.

The solid carbonaceous fuels are preferably ground to a particle size so that 100% of the material passes through an ASTM E 11-70 Sieve Designation Standard 1.4 mm (Alternative No. 14) and at least 80% passes through an ASTM E 11-70 Sieve Designation Standard 425 μm (Alternative No. 40).

The moisture content of the solid carbonaceous fuel particles is in the range of about 0 to 40 wt. %, such as 2 to 20 wt. %.

The term free-oxygen containing gas, as used herein is intended to include air, oxygen-enriched air, i.e., greater than 21 mole % oxygen, and substantially pure oxygen, i.e., greater than 95 mole % oxygen, (the remainder comprising $N_2$ and rare gases).

Simultaneously, a stream of free-oxygen containing gas is supplied to the reaction zone of the gas generator by way of a free passage in the burner, such as through the central conduit and/or annular passage at a temperature in the range of about ambient to 1500° F., and preferably in the range of about ambient to 300° F., for oxygen-enriched air, and about 500° to 1200° F., for air, and a pressure in the range of above about 1 to 300 atmospheres, such as 5 to 250 atmospheres, say 10 to 100 atmospheres. The atoms of free-oxygen plus atoms of organically combined oxygen in the solid carbonaceous fuel per atom of carbon in the solid carbonaceous fuel (O/C atomic ratio) may be in the range of 0.5 to 1.95. With free-oxygen containing gas in the reaction zone the broad range of said O/C atomic ratio may be about 0.5 to 1.7, such as about 0.7 to 1.4. More specifically, with air feed to the reaction zone, said O/C atomic ratio may be about 0.7 to 1.6, such as about 0.9 to 1.4.

The term temperature moderator as employed herein includes water, steam, $CO_2$, $N_2$, and a recycle portion of the product gas stream. The temperature moderator may be in admixture with the fuel stream and/or the oxidant stream.

For example in one embodiment, the feed stream comprises a slurry of liquid hydrocarbonaceous material and solid carbonaceous fuel. $H_2O$ in liquid phase may be mixed with the liquid hydrocarbonaceous carrier, for example as an emulsion. A portion of the $H_2O$ i.e., about 0 to 25 weight % of the total amount of $H_2O$ present may be introduced as steam in admixture with the free-oxygen containing gas. The weight ratio of $H_2O$/fuel may be in the range of about 0 to 5, say about 0.1 to 3.

The term liquid carrier, as used herein as the suspending medium to produce pumpable slurries of solid carbonaceous fuels is intended to include various materials from the group consisting of water, liquid hydrocarbonaceous material, and mixtures thereof. However, water is the preferred carrier for the particles of solid carbonaceous fuel. In one embodiment, the liquid carrier is liquid carbon dioxide. In such case, the liquid slurry may comprise 40-70 wt. % of solid carbonaceous fuel and the remainder is liquid $CO_2$. The $CO_2$-solid fuel slurry may be introduced into the burner at a temperature in the range of about $-67°$ F. to 100° F. depending on the pressure.

The term liquid hydrocarbonaceous material as used herein to describe suitable liquid carriers, is intended to include various materials, such as liquefied petroleum gas, petroleum distillates and residues, gasoline, naphtha, kerosine, crude petroleum, asphalt, gas oil, residual oil, tar sand oil and shale oil, coal derived oil, aromatic hydrocarbon (such as benzene, toluene, xylene fractions), coal tar, cycle gas oil from fluid-catalytic-cracking operation, furfural extract of coker gas oil, methanol, ethanol and other alcohols and by-product oxygen containing liquid hydrocarbons from oxo or oxyl synthesis, and mixtures thereof.

The subject burners as shown in FIGS. 1–5 may be operated with the feed streams passing through alternate passages in the burner. Typical modes of operation are summarized in Tables I and II below.

Table I lists the materials being introduced into the gasifier by way of the burner and their corresponding symbol. The solid carbonaceous fuel (B), water (C), and liquid hydrocarbonaceous material (E) may be mixed together in various combinations upstream from the burner inlet to produce a pumpable slurry which may be introduced into the burner and then passed through one of the several free-flow passages of the burner as shown in Table II. For example, the first entry in Table II shows that a pumpable slurry stream comprising solid carbonaceous fuel (B) in admixture with water (C) may be passed through the central or annular bundles of helical tubes, or both in the embodiments of the burner shown in either FIG. 2 or 5. Whenever a fuel stream is introduced into the burner, a corresponding stream of free-oxygen containing gas is simultaneously passed through the related central conduit or annular space, or both. Some additional examples follow:

(1) separate streams of free-oxygen containing gas may be passed through said central or annular bundles of helical tubes, or both; and simultaneously separate corresponding streams of a pumpable slurry of solid carbonaceous fuel in a liquid carrier are passed through the related central conduit, or annular space, or both.

(2) separate streams of free-oxygen containing gas are passed through said central conduit or said annular space, or both; while simultaneously a corresponding stream of liquid hydrocarbonaceous material is passed through the related central or annular bundles of helical tubes, or both; and simultaneously a pumpable slurry of solid carbonaceous fuel in a liquid carrier is passed through the free bunch of said helical tubes, if any.

(3) separate streams of free-oxygen containing gas are passed through said central or annular bundles of helical tubes, or both; while simultaneously a corresponding stream of liquid hydrocarbonaceous material is passed through the related central conduit, or annular space, or both; and simultaneously a pumpable slurry of solid carbonaceous fuel in a liquid carrier is passed through the free passage, if any.

TABLE I

| Material | Symbol |
|---|---|
| Free-oxygen Containing Gas | A |
| Solid Carbonaceous Fuel | B |
| Water | C |
| Steam | D |
| Liquid Hydrocarbonaceous Material | E |
| Temperature Moderating Gas | F |
| Gaseous Hydrocarbon Fuel | g |

TABLE II

| Central Conduit | Central Bundle of Helical Tubes | Annular Space | Annular Bundle of Helical Tubes |
|---|---|---|---|
| A | B + C | A | B + C |
| A + D | B + C | A + D | B + C |
| B + C | A | B + C | A |
| A | B + C | B + C | A |
| B + C | A | A | B + C |
| A | B + C + E | A | B + C + E |
| B + C + E | A + D | B + C + E | A + D |
| A | E | A | E |
| A + D | B + E | A + D | B + E |
| B + E | A + D | B + E | A + D |
| A + D | E | A | B + C |
| E | A | E | A |
| B + C | A | E | A |
| E | A | B + C | A |
| A | G | A | B + C |
| A | G | A + D | E |
| A | E + F | A | E + F |
| E + F | A + D | E + F | A + D |

Other modes of operation of the subject invention are possible in addition to those shown in Table II.

For example, jet streams of a gaseous material may be simultaneously introduced into the central conduit and/or annular passage, as previously described.

When one of the fuel streams is a liquid hydrocarbon or the liquid carrier for the slurry of solid carbonaceous fuel is a liquid hydrocarbonaceous material premature combustion within the burner may be avoided by one or more of the following:

(1) keeping the fuel below its autoignition temperature,
(2) including water in the solid fuel slurry,
(3) using air or air enriched with oxygen i.e. up to about 40 vol. % $O_2$,
(4) mixing steam with the air or oxygen,
(5) employing about 0 retraction of the ends of the central and annular bunches of tubes from the face of the burner. In such case, the free-oxygen containing gas such as substantially pure oxygen may be separately discharged from the burner without first contacting the fuel stream.
(6) discharging the multiphase mixture at the central and annular exit orifices at the tip of the burner with discharge velocities that exceed the flame propagation velocity.

The subject burner assembly is inserted downward through a top inlet port of a compact unpacked free-flow noncatalytic refractory lined synthesis gas generator, for example as shown in coassigned U.S. Pat. No. 3,544,291. The burner extends along the central longitudinal axis of the gas generator with the downstream end discharging directly into the reaction zone.

The relative proportions of the reactant feed streams and optionally temperature moderator that are introduced into the gas generator are carefully regulated to convert a substantial portion of the carbon in the fuel e.g., up to about 90% or more by weight, to carbon oxides; and to maintain an autogenous reaction zone temperature in the range of about 1700° to 3500° F., preferably in the range of 2000° to 2800° F.

The dwell time in the reaction zone is in the range of about 1 to 10 seconds, and preferably in the range of about 2 to 8. With substantially pure oxygen feed to the gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S+COS$ nil to 5, $N_2$ nil to 5, and A nil to 1.5. With air feed to the gas generator, the composition of the generator effluent gas in mole % dry basis may be about as follows: $H_2$ 2 to 30, CO 5 to 35, $CO_2$ 5 to 25, $CH_4$ nil to 2, $H_2S+COS$ nil to 3, $N_2$ 45 to 80, and A 0.5 to 1.5. Unconverted carbon and ash are contained in the effluent gas stream.

The hot gaseous effluent stream from the reaction zone of the synthesis gas generator is quickly cooled below the reaction temperature to a temperature in the range of about 250° to 700° F. by direct quenching in water, or by indirect heat exchange, for example, with water to produce steam in a gas cooler.

DESCRIPTION OF THE DRAWING

A more complete understanding of the invention may be had by reference to the accompanying schematic drawing which shows the subject invention in detail. Although the drawing illustrate preferred embodiments of the invention, it is not intended to limit the subject invention to the particular apparatus or materials described.

Figure 1:
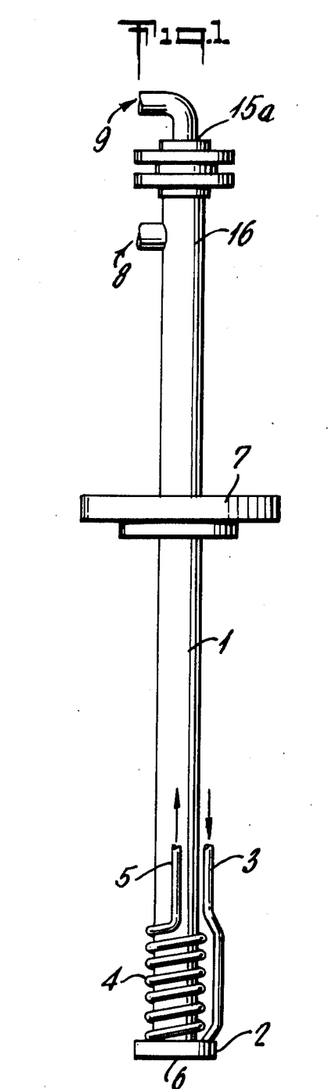
FIG. 1 is a general illustration of the burner assembly.

Referring to the figures in the drawing, FIG. 1 is a general illustration of the burner assembly indicated generally as 1. Face-cooling chamber 2 is located at the downstream tip of the burner. Circulating cooling water enters by way of inlet pipe 3. The cooling water departs by way of coils 4 that encircle the outside diameter of the burner along its length and through outlet pipe 5. By means of cooling chamber 2 and cooling coils 4, burner 1 may be protected from thermal damage. Face 6 is at the outermost downstream tip of burner 1. Burner 1 is installed downwardly through a port in the top of a conventional free-flow partial oxidation synthesis gas generator (not shown). The longitudinal central axis of burner 1 is preferably aligned along the central axis of the synthesis gas generator by means of mounting flange 7. Reactant streams pass into the upstream burner end 15a by way of inlets 8 and 9.

Figure 2:
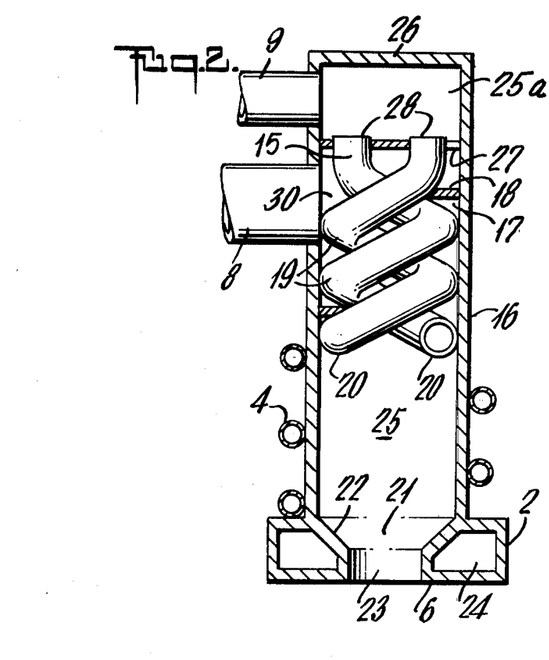
FIG. 2 is a diagrammatic longitudinal cross-section through one embodiment of the swirl burner employing a central bundle of helical tubes with retracted ends to provide a pre-mix chamber.

In FIG. 2, one embodiment of the swirl burner is shown in diagrammatic longitudinal cross-section. This view comprises unobstructed central coaxial retracted central bundle of helical tubes 15 which is surrounded by outer concentric coaxial conduit 16. One coaxial concentric ring of two helical coils is shown. Spacing and supporting means 18 may provide a plurality of related free-flow helical-shaped passages 17 in the cylindrical space surrounding the central bundle of helical tubes 15.

In another embodiment, not shown, the inlets and outlets of the separate helical coils in central bundle of helical tubes 15 are located at the intersections of a plurality of coaxial concentric rings and a plurality of evenly spaced radial rows. The sides of the helical coils in adjacent concentric rings may or may not touch. By this means the feed stream entering outer conduit 16 by way of inlet 8 may pass down through a plurality of helical passages or into the interstices between the helical coils.

Exit orifices 20 at the downstream tips of the plurality of helical coils 19 in the central bundle of helical tubes 15 preferably are circular in cross-section and terminate in a plane perpendicular to the longitudinal axis of the burner. Outer conduit 16 terminates at the downstream end of the burner with converging nozzle 21. A vertical cross-section of exit orifice 21 may be frusto-conically shaped, which may or may not merge into a right cylinder. Preferably for wear resistance, as shown in FIG. 2, nozzle 21 comprises a frusto-conical rear portion 22 that develops into a right cylindrical front portion 23 which terminates at the downstream face 6 of the burner.

The downstream end of the burner may or may not be cooled. Preferably, as shown in FIG. 2, coaxial annular shaped cooling chamber 2 surrounds exit orifice 21 at the burner tip. By passing water through cored section 24 of cooling chamber 2, the tip of burner 1 may be prevented from overheating. Optionally for similar reasons, outer conduit 16 may be kept cool by passing water through coils 4. Suitable converging angles for orifice 21 are in the range from about 15° and 90° from the central longitudinal axis of the burner. While the downstream tips of exit orifices 20 of helical coils 19 may be flush with burner face 6, in the embodiment shown in FIG. 2, the tips of helical coils 19 are severely retracted upstream from face 6 of the burner a distance of two or more times the minimum diameter of converging exit nozzle 21. For example, the setback of tips 20 of central helical coils 19 from burner face 6 may be in the range of about 3 to 10 times the minimum diameter of converging exit nozzle 21. The space between tips 20 of central helical coils 19 and burner face 6 constitutes the unobstructed pre-mix zone 25.

In the operation of the burner as shown in FIG. 2, either reactant stream i.e. see Table II supra, may enter the burner by way of inlet 9 and pass directly into central manifold 25a. Central manifold 25a is a closed cylindrical chamber comprising upper closed head 26 and lower tube sheet 27. The upstream open ends 28 of the plurality of helical coils 19 pass perpendicularly through tube sheet 27 and make gastight hermetic seals therewith. By this means, the upstream ends of helical passages 17 in outer conduit 16 are closed.

The feed stream in central manifold 25a is split into a plurality of streams which swirl down through the plurality of free-flow helical coils 19, out through exit orifices 20, and into pre-mix zone 25, as shown in FIG. 2. Simultaneously and concurrently, the second reactant stream enters the subject burner by way of inlet 8 of FIGS. 1 and 2 and is split into a plurality of streams which swirl down from the upstream portion 30 of outer conduit 16 through the plurality of free-flow helical passages 17 or down through the interstices between individual spaced helical coils, or both. The two reactant streams impinge in pre-mix zone 25 where intimate mixing of the streams takes place. Further, direct heat exchange between the two reactant streams takes place in pre-mix zone 25. The temperature in the pre-mix zone is controlled so that a controlled amount of the liquid carrier may be vaporized without burning i.e. from 0 to 100 vol. % say about 2 to 80 vol. %. Temperature control in the pre-mix zone may be effected by controlling such factors as dwell time and heat content of the entering streams, and amount of external cooling such as by coils 4, if any. Pre-mix zone 25 is substantially free from any obstruction to the free-flow of the materials passing therethrough.

The velocity of the slurry of solid carbonaceous fuel in liquid carrier passing through exit orifices 20 of the central bundle of helical tubes 15 or alternately exiting from passages 17 is in the range of about 2.0 to 100 ft. per sec., such as 10 to 50 ft. per sec., say about 2 to 20 ft. per sec. The corresponding velocity for the free oxygen containing gas simultaneously passing through the other passage in the burner optionally in admixture with steam, is in the range of about 150 feet per second to sonic velocity, such as about 100 to 600 ft. per sec., say about 200 to 500 ft. per sec. The slurry of solid carbonaceous fuel in liquid carrier enters the pre-mix zone in liquid phase at a temperature in the range of about ambient to 500° F., and below the vaporization temperature of the liquid carrier. The pressure may be for example in the range of about 76 to 4500 psia. While simultaneously, the free-oxygen containing gas stream, optionally in admixture with steam, enters into the pre-mix zone at a temperature in the range of about ambient to 1200° F., say about 100° to 600° F., and at a pressure in the range of about 76 to 4500 psia. Intimate mixing and direct heat exchange takes place between the two reactant streams in the pre-mix zone. Volatilization of the liquid carrier in the pre-mix zone may amount to about 0 to 100 vol. %, say about 20 to 35 vol. % when the free-oxygen containing gas is introduced at a temperature in the range of about 300° to 600° F., or from about 70 to 100 vol. % when the free-oxygen containing gas is introduced as air preheated to a temperature in the range of about 1000° to 1200° F. The multiphase mixture in the pre-mix zone is at a temperature below its autoignition temperature. The multiphase mixture leaves burner 1 by way of exit orifice 21 at a discharge velocity in the range of about 75 to 600 ft. per sec., say about 150 to 350 ft. per sec., and above the flame propagation velocity and passes downwardly directly into the unobstructed reaction zone of the partial oxidation gas generator.

Figure 3:
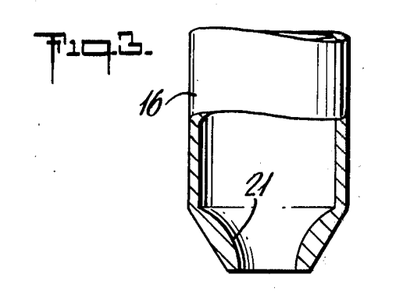
FIG. 3 is a view of another example of the downstream outlet of the coaxial conduit 16 shown in FIG. 2.

FIG. 3 is a vertical sectional view of another embodiment of the downstream end of outer conduit 16 as shown in FIG. 2. In FIG. 3, converging exit nozzle 21 is in the shape of an American Society of Mechanical Engineer's (A.S.M.E.) standard long-radius nozzle. It may or may not be cooled, such as by means of annular cooling chamber 2, in the manner shown in FIG. 2. A further description of said nozzle may be found in "Thermodynamics Fluid Flow and Heat Transmission" by Humber O. Croft, page 155, First Edition, 1938 McGraw-Hill Book Company.

Figure 4:
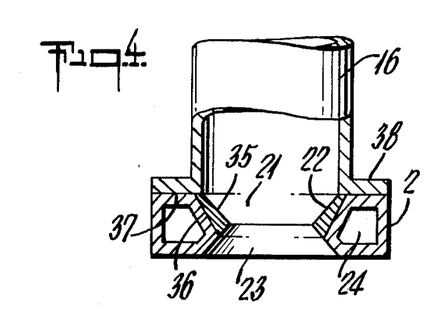
FIG. 4 is a view of still another example of the downstream outlet of conduit 16 shown in FIG. 2.

FIG. 4 is a vertical sectional view of another embodiment of the downstream end of outer conduit 16 as shown in FIG. 2. In FIG. 4, exit nozzle 35 at the tip of the burner is made from a wear resistant material such as tungsten carbide or silicon carbide. Exit nozzle 35 comprises a frusto-conical converging rear portion 22 which develops into a frusto-conical diverging front portion 23. The frusto-conical converging outside diameter of exit orifice 35 is supported by coaxial frusto-conical mating converging cavity 36 in annular cooling chamber 2. For example, exit orifice 35 made from tungsten carbide may be connected to the downstream tip of outer conduit 16 by joining the back surface 37 of cooling chamber 2 to the front surface of end flange 38 at the downstream end of outer conduit 16. Cooling water may be introduced into cored section 24 of cooling chamber 2 in the manner shown for inlet pipe 3 in FIG. 1. Optionally, a cooling coil may encircle outer conduit 16 in the manner shown for coil 4 in FIG. 1. Hot high velocity slurries of solid fuel are abrasive. The life of the subject burner may be considerably extended by making exit nozzle 35 from a wear resistant material.

Figure 5:
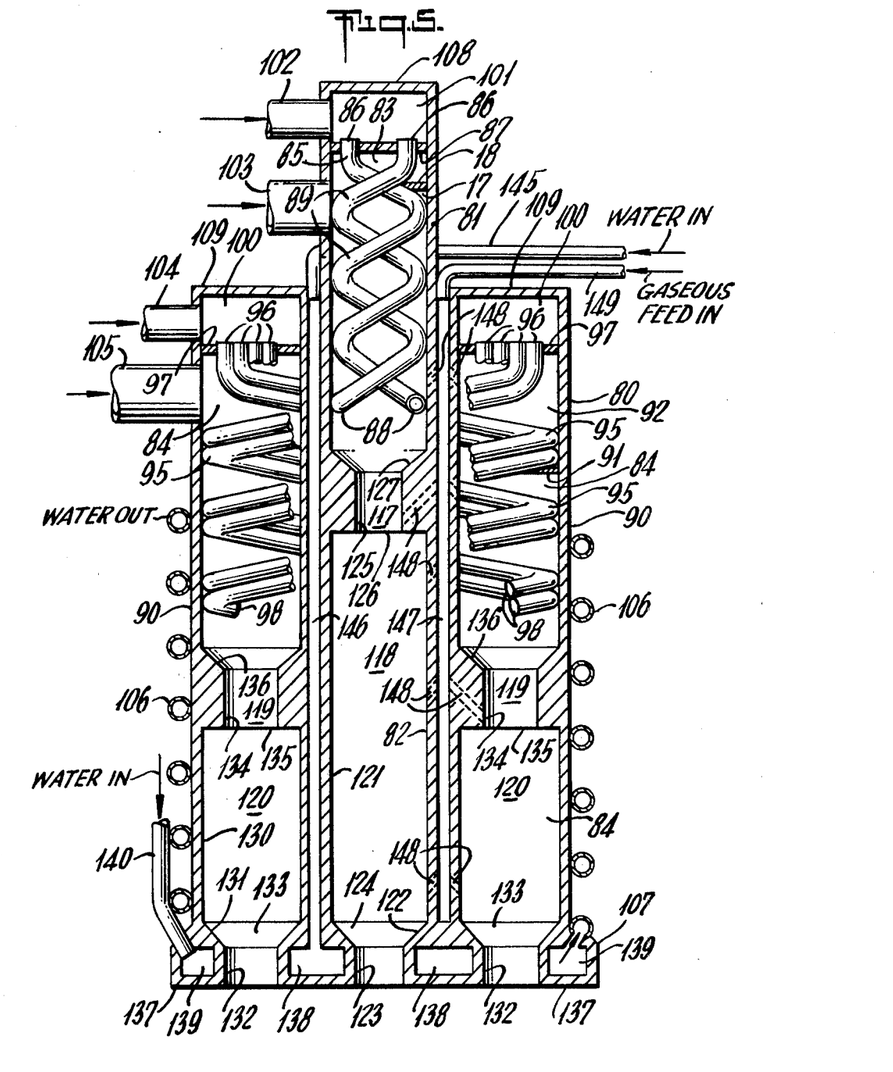
FIG. 5 is a vertical longitudinal schematic representation of one embodiment of the subject burner having a high turn-down capability. Central and annular bundles of helical tubes with downstream retracted ends provide two central and annular pre-mix chambers in series.

FIG. 5 is a vertical longitudinal schematic representation of another embodiment of the subject swirl burner but with the addition of pre-mix and high turndown features. Two pre-mix chambers in series are located in the central conduit and also in the annular passage. The ends of the central and annular bundles of helical tubes are shown retracted upstream from the face of the burner. However in another embodiment (not shown) in which there are no pre-mix chambers in central passage 83, the downstream tips 88 of helical coils 89 may be flush with face 137 of the burner. The burner may be operated with feed streams passing through either the central, annular, or both bundles of helical tubes and through the plurality of helical passages in the related conduits surrounding said bundles of tubes. By this means, flow through the burner may be turned up or down. In FIG. 5, burner 80 comprises a central section and an annular section. The central section is similar to the embodiment shown in FIG. 2. In the central section, central conduit 81 in part constitutes the wall 82 between central passage 83 and coaxial radially spaced annular passage 84. A central bundle of helical tubes 85 passes down through the upper portion of central passage 83. The central section of FIG. 5 includes a single coaxial concentric ring, with two helical coils 89. However, the central sections of other embodiments may include a plurality of coaxial concentric rings containing a plurality of helical tubes. Upstream inlets 86 of helical coils 89 pass through tube sheet 87 and make a gastight hermetic seal therewith. These inlets are shown lying in two radial rows spaced 180° apart. Downstream ends 88 are retracted upstream from face 137 at the downstream end of burner 80. Supporting and optionally spacing means 18 may provide a plurality of related free-flow helical-shaped passages 17 in the cylindrical space surrounding the central bundle of helical tubes 85.

In the annular section of burner 80, coaxial concentric radially spaced outer conduit 90 surrounds annular passage 84 along its length. An annular bundle of helical tubes 95 passes down through annular passage 84 and comprises four coaxial concentric rings of helical coils 95. Only two of the plurality of radial rows are shown. Further, two of the plurality of helical coils are shown in each concentric ring for illustrative purposes only. For clarity four of the helical coils have been cut-off near the upstream inlets. The actual number of helical coils in a concentric ring is a function of pipe size, ring diameter, and spacing between radial rows. Spacing and supporting means 91 may provide a plurality of related free-flow helical passages 92 in the annular space surrounding the annular bundle of helical tubes 95. Upstream inlet ends 96 of concentric helical coils 95 pass through tube sheet 97 and make gastight seals therewith. Downstream tube outlet ends 98 are shown retracted upstream from face 137. In another embodiment (not shown) in which there are no pre-mix chambers in annular passage 84, the downstream ends 98 of helical coils 95 may be flush with burner face 137. Annular manifold 100 is in communication with the upstream ends 96 of said annular bunch of tubes 95. Manifold 101, which may be cylindrical-shaped, is in communication with the upper ends 86 of said central bunch of tubes 85.

Inlet means 102 is employed for introducing a first feed stream into said central manifold 101. Inlet means 103 near the upstream end of central conduit 81 is used to introduce a second feed stream into the upstream end of central passage 83 and from there into the helical passages and/or interstices surrounding central bunch of tubes 85. Similarly, inlet means 104 is employed for introducing a third feed stream into annular manifold 100. Inlet means 105, near the upstream end of outer conduit 90 is used to introduce a fourth feed stream into the upstream end of annular passage 84 and from there into the helical passages and/or interstices surrounding the annular bunch of tubes 95. Optionally to provide additional swirl, inlets 103 and/or 105 may be oriented so that the second and fourth feed streams may be respectively introduced tangentially into central conduit 81 and outer conduit 90. Optionally, inlets 102 and/or 104 may be oriented so that the first and third feed streams may be respectively introduced through the top of manifolds 101 and 100. The burner is cooled by a coolant flowing through cooling coils 106 which encircle the outside diameter of outer conduit 90 along its length, and cored cooling chamber 107 at the downstream tip of the burner.

Disc shaped central tube sheet 87 closes off central passage 83 near its upstream end. Similarly, annular shaped tube sheet 97 closes off annular passage 84 near its upper end. Conventional means i.e. welding, turning, crimping, threading, rolling may be employed to provide a pressure and gastight hermetic seal or joint where the central and annular bunches of tubes penetrate the respective tube sheets. Mechanical pressure fittings and coupling devices may be also employed.

Plate 108 which may be disc-shaped seals off the upper end of central conduit 81. The space between plate 108 and tube sheet 87 constitutes said central manifold 101. By this means, for example, a portion of a first reactant feed stream in feed pipe 102 may be introduced into central manifold 101 and then split into a plurality of streams which pass through tube sheet 87 by way of the individual tubes in central bundle of helical tubes 85. Similarly, annular shaped disc 109 seals off the upper end of annular passage 84. The space between annular disc 109 and annular tube sheet 97 constitutes annular manifold 100. Simultaneously and concurrently with the introduction of the first reactant feed stream, the third reactant feed stream in feed pipe 104 may be introduced into annular manifold 100 and then split into a plurality of streams which pass through tube sheet 97 by way of the individual tubes in annular bundle 95.

Wall brackets or tube spacers 91 hold the individual tubes in annular bundle of helical tubes 95 in a fixed touching or nontouching relationship with respect to each other and the inside of outer conduit 90. Similarly, wall brackets or tube spacers 18 hold the individual tubes in central bundle of helical tubes 85 in a fixed touching or nontouching relationship with respect to each other and the inside diameter of central conduit 81.

While the pre-mix zones in the embodiment in FIG. 5 are shown as comprising two separate coaxial central pre-mix chambers 117 and 118 in series in central passage 83, and two separate coaxial annular pre-mix chambers 119 and 120 in series in annular passage 84, the pre-mix zone of other embodiments of the subject invention may actually comprise one or more, such as 2 to 5 coaxial central and/or annular pre-mix chambers. Each central pre-mix chamber, except for the first chamber in the line, comprises a coaxial cylindrical body portion 121 followed by a coaxial at least partially converging frusto-conical outlet portion 122 that may optionally develop into a normal cylindrical portion 123. This outlet portion is shown in FIG. 5 as a converging central nozzle 124 which terminates at the downstream face of the burner. Optionally, nozzles 124 and 133 to be further described may be made from a thermal and wear resistant material i.e. silicon carbide or tungsten carbide.

The first central pre-mix chamber in the line may have a straight coaxial cylindrical body portion 125, that discharges through circular orifice 126 directly into the next in line central coaxial pre-mix chamber 118. Preferably, the inlet to the first central pre-mix chamber 117 is a portion of a converging frusto-conical shaped section 127.

Each of the coaxial annular shaped pre-mix chambers 120 except the first annular shaped chamber 119 comprises a coaxial generated normal cylindrical annular body portion 130 followed by a coaxial generated at least partially converging frusto-conical shaped annular outlet portion 131 that may optionally develop into a coaxial generated normal cylindrical annular portion 132. This outlet portion is shown in FIG. 5 as a converging annular exit nozzle 133 which terminates at the downstream face of the burner. The first coaxial annular shaped pre-mix chamber 119 comprises a coaxial generated normal cylindrical annular body portion 134 that discharges through annular orifice 135 into the next in line coaxial annular shaped pre-mix chamber 120. Preferably, the inlet to the first annular shaped pre-mix chamber 119 comprises a portion of a coaxial generated converging frusto-conical shaped section 136.

Cored faceplate 107 comprises a tip portion 137 at the extreme tip of the burner, which may be flat or curved, and which contains a coaxial central annular shaped cooling chamber 138 surrounding the central conduit exit nozzle 124 and/or a coaxial radially spaced annular spaced cooling chamber 139 surrounding said annular exit nozzle 133 at the tip of the burner. The cooling chamber may be joined to the otherwise flat burner tip, or it may be an extension of the central and outer conduits. Cold cooling water in line 140 enters annular shaped cooling chamber 139, splits by means of baffles and flows about 180°, and leaves by way of an opposite outlet which is connected to outer coils 106. Cooling water is introduced into central annular cooling chamber 138 by way of line 145 which is connected to passage 146 that passes longitudinally down through wall 82 in central conduit 81. The cool water splits by means of baffles, flows about 180° around central cooling channel 138, and leaves by way of an opposite coaxial longitudinal passage (not shown) similar to passage 146 but in another location in wall 82.

Optionally, a gaseous feed stream selected from the group consisting of steam, free-oxygen containing gas, $CO_2$, $N_2$, fuel gas, recycle portion of the product gas, and mixtures thereof may be introduced into at least one of the central and/or annular pre-mix chambers by way of at least one inlet pipe 149 which is connected to at least one longitudinal passage 147 in wall 82 of central conduit 81, and at least one branch passage 148 connecting longitudinal passage 147 with said pre-mix chambers.

Although modifications and variations of the invention may be made without departing from the spirit and scope thereof, only such limitations should be imposed as are indicated in the appended claims.

We claim:

1. A burner for mixing together separate feed streams to produce a multi-phase mixture for reaction in a partial oxidation gas generator comprising: a central bundle of open-ended helical tubes whose central longitudinal axis is coaxial with the central longitudinal axis of the burner and comprising one ring or a plurality of rings concentric with the central longitudinal axis of the burner of helical tubes with each individual helical tube having upstream inlet means passing perpendicularly through a tube sheet forming a gas tight seal therewith and in communication with conduit means by which a first reactant feed stream may be introduced and then split into a plurality of separate streams which pass down through said central bundle of helical tubes and are then discharged through the downstream ends of said tubes; a first coaxial cylindrical conduit concentric with and surrounding said central bundle of helical tubes, said first conduit being closed near the upstream end and forming a manifold means with said tube sheet located within said conduit below said closed end and said first conduit having an unobstructed circular downstream outlet at the tip of the burner comprising a converging frustoconical rear portion that develops into a right cylindrical front portion which terminates at the downstream face of the burner; upstream inlet means in communication with said first conduit through which a second reactant feedstream may be separately introduced and split into a plurality or swirling streams which may pass down through a plurality of related helical-shaped passages formed in the cylindrical space that surrounds the central bundle of helical tubes and/or through the interstices, between adjacent nontouching helical tubes, if any; and means for supporting the individual helical tubes in said central bundle of helical tubes with respect to said first conduit and each other; wherein the downstream tips of the individual helical tubes in said central bundle of helical tubes are retracted upstream from the downstream face of the burner a distance of 2 or more times the minimum diameter of said first conduit downstream outlet to provide a central pre-mix zone comprising at least one coaxial cylindrical shaped pre-mix chamber in series; and said first and second swirling reactant feed streams impinge together and are intimately mixed and said multi-phase mixture is produced in said central pre-mix zone prior to being discharged through said first conduit downstream outlet.

2. The burner as described in claim 1 wherein said central bundle of helical tubes comprises 2 to 180 open-ended helical tubes.

3. The burner as described in claim 1 wherein said pre-mix zone comprises a plurality of pre-mix chambers and each pre-mix chamber except the first chamber comprises a coaxial cylindrical body portion followed by a coaxial at least partially converging outlet portion, and said first pre-mix chamber comprises a straight coaxial cylindrical body portion that discharges directly into the next in line coaxial pre-mix chamber.

4. The burner as described in claim 3 wherein the converging outlet portion of said pre-mix chambers is made from tungsten carbide or silicon carbide.

5. The burner as described in claim 1 wherein the first conduit downstream outlet is made from a thermal and wear resistant material.

6. The burner as described in claim 5 further provided with a coaxial annular shaped cooling chamber surrounding said first conduit downstream outlet.

7. The burner described in claim 6 wherein said cooling chamber and downstream outlet constitute a single piece of thermal and wear resistant material.

8. The burner as described in claim 7 wherein said thermal and wear resistant material is tungsten carbide or silicon carbide.

9. The burner as described in claim 1 further provided with a coaxial annular shaped cooling chamber surrounding the first conduit downstream outlet, and with or without cooling coils that encircle the outside diameter of the burner along its length.

10. A burner for mixing together separate feed streams to produce a multi-phase mixture for reaction in a partial oxidation gas generator comprising: a central bundle of open-ended helical tubes whose central longitudinal axis is coaxial with the central longitudinal axis of the burner and comprising ring or a plurality of rings concentric with the central longitudinal axis of the burner of helical tubes with each individual helical tube having upstream inlet means passing perpendicularly through a tube sheet forming a gas tight seal therewith and in communication with manifold inlet means by which a first reactant feed stream may be introduced and then split into a plurality of separate streams which pass down through said central bundle of helical tubes and are then discharged through the downstream ends of said tubes; a first coaxial cylindrical conduit concentric with and surrounding said central bundle of helical tubes, said first conduit being closed near the upstream end and forming said manifold means with said tube sheet located within said first conduit below said closed end, and said first conduit having an unobstructed circular downstream outlet at the tip of the burner; upstream inlet means in communication with said first conduit through which a second reactant feed stream may be separately introduced and split into a plurality of swirling streams which may pass down through a plurality of related helical-shaped passages formed in the cylindrical space that surrounds the central bundle of helical tubes and/or through the interstices between adjacent nontouching helical tubes, if any; and means for supporting the individual helical tubes in said central bundle of helical tubes with respect to said first conduit and each other; wherein the downstream tips of the individual helical tubes in said central bundle of helical tubes are retracted upstream from the downstream face of the burner a distance of 0-12 times the minimum diameter of said first conduit downstream outlet; and said first and second swirling reactant feed streams impinge together and are intimately mixed; a second concentric coaxial cylindrical conduit surrounding said first conduit along a least a portion of its length; said first and second conduits being radially spaced with respect to each other to provide a coaxial annular space between the outside diameter of the first conduit and the inside diameter of said second conduit, said annular space being closed near the upstream end and having an unobstructed downstream annular outlet at the tip of the burner; an annular bundle of helical tubes whose central longitudinal axis is coaxial with the central longitudinal axis of the burner and comprising one ring or a plurality of rings concentric with the central longitudinal axis of the burner of helical tubes with each individual helical tube having upstream inlet means passing perpendicularly through a tube sheet forming a gas tight seal therewith and being in communication with an upstream annular inlet means through which a third reactant feed stream may be introduced and split into a plurality of separate streams which pass down through the individual helical tubes in said annular bundle of helical tubes and are then discharged through the downstream ends of said tubes; upstream inlet means in communication with said second conduit through which a fourth reactant feed stream may be separately introduced and split into a plurality of swirling streams which may pass down through a plurality of related helical-shaped passages formed in the annular space that surrounds the annular bundle of helical tubes and/or through the interstices between adjacent nontouching helical tubes, if any; and means for supporting the individual helical tubes in said annular bundle of helical tubes with respect to said first and second conduits and each other; wherein the downstream tips of the individual helical tubes in said annular bundle of helical tubes are retracted upstream from the downstream face of the burner a distance of about 0 to 12 times the minimum width of the downstream annular outlet at the tip of the burner; and said third and fourth reactant feed streams impinge and are intimately mixed together.

11. The burner as described in claim 10 wherein said central conduit downstream outlet and/or said annular downstream outlet have converging or converging-straight, or converging-diverging sections.

12. The burner as described in claim 10 provided with a water-cooled face plate at the downstream tip of the burner.

13. The burner as described in claim 12 wherein said water-cooled face plate comprises an annular cooling chamber that encircles the tip of the burner.

14. The burner as described in claim 10 or 12 provided with cooling coils that encircle the outside diameter of said second conduit along its length.

15. The burner as described in claim 10 wherein the downstream ends of the individual helical tubes in the central bundle of helical tubes are retracted upstream from the face of the burner a distance of about 2 or more times the minimum diameter of said first conduit downstream outlet to provide a central pre-mix zone and/or the downstream ends of the individual helical tubes in the annular bundle of helical tubes are retracted upstream from the face of the burner a distance of about 2 or more times the minimum width of said annular downstream outlet to provide an annular pre-mix zone.

16. The burner as described in claim 15 provided with a plurality of cylindrical shaped pre-mix chambers in said first conduit and each of said cylindrical shaped pre-mix chambers except the first cylindrical shaped chamber comprises a coaxial cylindrical body portion followed by a coaxial at least partially converging outlet portion, and said first cylindrical-shaped pre-mix chamber comprises a normal coaxial cylindrical body portion that discharges directly into the next in line coaxial cylindrical shaped pre-mix chamber; and/or a plurality of annular shaped pre-mix chambers in said annular space and each of said annular shaped pre-mix chambers except the first annular shaped chamber comprises a coaxial generated normal cylindrical annular body portion followed by a coaxial generated converging frusto-conical shaped annular outlet portion, and said first annular shaped pre-mix chamber comprises a coaxial generated normal cylindrical annular body portion that discharges directly into the next in line coaxial annular shaped pre-mix chamber.

17. The burner as described in claim 16 wherein the converging outlet portions of said pre-mix chambers are made from tungsten carbide or silicon carbide.

18. The burner as described in claim 10 wherein the first conduit downstream outlet comprises a frusto-conical rear portion having a converging angle in the range of about 15° to 90° from the central longitudinal axis of the burner; and said rear portion may develop into a normal cylindrical front portion which terminates at the downstream face of the burner and which cylindrical front portion may have a height in the range of about 0 to 1.5 times its own diameter; and/or said annular downstream outlet comprises a generated converging frusto-conical shaped annular rear portion having converging angles in the range of about 15° to 90° from the central axis of the frusto-conical section, said central axis being parallel to the central longitudinal axis of the burner, and said rear portion may develop into a generated normal cylindrical annular front portion which terminates at the downstream face of the burner and which cylindrical front portion may have a height in the range of about 0 to 1.5 times its own width.

19. The burner as described in claim 10 wherein the first conduit downstream outlet and/or the annular downstream outlet comprise frusto-conical front and rear portions having respectively converging and diverging angles in the range of about 15° to 90° from the central longitudinal axis of the burner.

20. The burner as described in claim 18 wherein the first conduit downstream outlet and/or the annular downstream outlet are made from thermal and wear resistant material.

21. The burner as described in claim 18 further provided with a coaxial annular shaped cooling chamber surrounding said first conduit downstream outlet and-/or said annular downstream outlet.

22. The burner described in claim 21 wherein said cooling chamber, first conduit downstream outlet and-/or said annular downstream outlet constitute a single piece of thermal and wear resistant material.

23. The burner as described in claim 22 wherein said thermal and wear resistant material is tungsten carbide or silicon carbide.

24. The burner as described in claim 10 wherein the first conduit downstream outlet and/or the annular downstream outlet are respectively in the shape of and generated by a standard long-radius nozzle.

25. The burner as described in claim 15 provided with a plurality of longitudinal gas conduits parallel to the burner axis and radially spaced between said first and second conduits, said gas conduits being closed at the downstream end near the burner tip; a plurality of feeder lines connecting said gas conduits to said central and/or annular pre-mix zones; and conduit means connected to the upstream ends of the longitudinal gas conduits for introducing a gaseous feed stream selected from the group consisting of steam, free-oxygen containing gas, $CO_2$, $N_2$, fuel gas, a recycle portion of the product gas, and mixtures thereof.

26. A burner for the partial oxidation of solid carbonaceous fuels comprising: a central conduit, said central conduit being closed at the upstream end and having a downstream exit nozzle comprising a frustoconical rear portion that develops into a normal cylindrical front portion which terminates at the face of the burner; an outer conduit coaxial and concentric with said central conduit and forming an annular passage therebetween, said outer conduit and annular passage being closed at the upstream end and having a downstream annular exit nozzle comprising a generated converging frustoconical shaped annular rear portion that develops into a generated normal cylindrical annular front portion which terminates at the face of the burner; a central bundle of open-ended helical tubes comprising one ring or a plurality of rings concentric with the central longitudinal axis of the burner of helical tubes with each individual helical tube having a separate inlet means passing perpendicularly through a tube sheet forming a gas tight seal therewith; means for supporting the helical tubes in said central bundle of helical tubes with respect to the inside wall of said central conduit and to each other so that the external surfaces of the helical tubes in said central bundle of helical tube form a plurality of central helical passages within said central conduit; upstream inlet means including a manifold for splitting and introducing a first feed stream into the upstream inlet means of the individual helical tubes in said central bundle of helical tubes; and wherein the downstream ends through which said first feed stream is discharged are retracted upstream from the burner face a distance of about 3 to 10 times the minimum diameter of the central conduit exit nozzle at the tip of the burner to provide a central pre-mix zone; upstream inlet means for introducing a second feed stream into said central conduit and down through said plurality of central helical passages; an annular bundle of open-ended helical tubes comprising one ring or a plurality of rings concentric with the central longitudinal axis of the burner of helical tubes with each individual helical tube having a separate inlet means passing perpendicularly through a tube sheet forming a gas tight seal therewith; means for supporting the individual helical tubes in said annular bundle of helical tubes with respect to the inside wall of said annular passage and to each other so that the external surfaces of the individual helical tubes in said annular bundle of helical tubes form a plurality of annular helical passages within said annular passage; upstream inlet means including a manifold for splitting and introducing a third feed stream into the upstream ends of the individual helical tubes in said annular bundle of helical tubes, and wherein the downstream ends of the helical tubes through which said third feed stream is discharged are retracted upstream from the burner face a distance of about 3 to 10 times the minimum width of the annular exit nozzle at the tip of the burner to provide an annular pre-mix zone; upstream inlet means in communication with said outer conduit for introducing a fourth feedstream into said annular passage and down through said plurality of annular helical passages; and at least one coaxial cylindrical shaped pre-mix chamber in series in said central pre-mix zone in which said first and second feed streams are mixed, and/or at least one coaxial annular shaped pre-mix chamber in series in said annular pre-mix zone in which said third and fourth feed streams are mixed.

27. The burner as described in claim 26 provided with a plurality of longitudinal gas conduits parallel to the burner axis and radially spaced between said central conduit and said annular passage, said gas conduits being closed at the downstream end near the burner tip and connected to a gaseous feed stream at the upstream end; and a plurality of feeder lines connecting said gas conduits to said pre-mix chambers in said central conduit and/or in said annular passage for introducing a gaseous feed stream.

28. The burner as described in claim 26 provided with cooling coils encircling the outside circumference of the burner at the downstream end and/or a water-cooled face plate at the downstream tip of the burner.

29. The burner as described in claim 28 wherein said water-cooled face plate comprises an outer annular cooling chamber that encircles the outside diameter of said annular exit nozzle, and/or an inner annular cooling chamber that encircles said central conduit exit nozzle.

30. The burner as described in claim 29 provided with inlet and outlet longitudinal water conduits parallel to the burner axis and radially spaced between said central conduit and said annular passage; and wherein said inlet and outlet water conduits are connected to said inner annular cooling chamber to introduce cold water and to remove hot water.

31. The burner as described in claim 26 wherein said central bundle of helical tubes comprises 1–200 helical coils, and said annular bundle of helical tubes comprises 1–600 helical coils.

32. The burner as described in claim 26 wherein all of the helical tubes in both the central and annular bundles of helical tubes are twisted in the same direction, either clockwise or counterclockwise, or alternatively all of the helical tubes in the central bundle of the helical tubes are twisted in the opposite direction of the helical tubes in the annular bundle of helical tubes.

* * * * *

UNITED STATES PATENT AND TRADEMARK OFFICE
CERTIFICATE OF CORRECTION

PATENT NO. : 4,371,378

DATED : February 1, 1983

INVENTOR(S) : A. BRENT, C. P. MARION, G. N. RICHTER, W. B. CROUCH, E. T. CHILD and B. REYNOLDS It is certified that error appears in the above—identified patent and that said Letters Patent is hereby corrected as shown below:

Column 3   line 45   Change "with" to --when--

Column 5   line 43   After "lines" insert --and--

Column 7   line 3    Change "circularly" to --circular--

Column 20  line 52   After "comprising" insert --one--

Signed and Sealed this

Twenty-fourth Day of May 1983

[SEAL]

Attest:

DONALD J. QUIGG

Attesting Officer            Acting Commissioner of Patents and Trademarks